United States Patent
Warnick et al.

(10) Patent No.: US 6,606,409 B2
(45) Date of Patent: Aug. 12, 2003

(54) FADE-IN AND FADE-OUT TEMPORAL SEGMENTS

(75) Inventors: James Warnick, Pittsford, NY (US); Ahmet M. Ferman, Rochester, NY (US); Bilge Gunsel, Rochester, NY (US); Milind R. Naphade, Champaign, IL (US); Rajiv Mehrotra, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/777,450

(22) Filed: Feb. 6, 2001

(65) Prior Publication Data

US 2001/0004403 A1 Jun. 21, 2001

Related U.S. Application Data

(62) Division of application No. 08/902,545, filed on Jul. 29, 1997, now Pat. No. 6,195,458.

(51) Int. Cl.[7] .................................................. G06K 9/34
(52) U.S. Cl. ........................ 382/173; 382/225; 382/165; 348/700
(58) Field of Search ................................. 382/173, 305, 382/224–225, 162, 165, 170, 171, 236, 164; 345/723; 348/700, 699, 701, 722; 375/240.08

(56) References Cited

U.S. PATENT DOCUMENTS

| 5,778,108 A | * | 7/1998 | Coleman, Jr. ............... 382/305 |
| 5,959,697 A | * | 9/1999 | Coleman, Jr. ............... 348/700 |
| 6,195,458 B1 | * | 2/2001 | Warnick et al. ............. 382/173 |
| 6,351,556 B1 | * | 2/2002 | Loui et al. .................. 382/164 |

OTHER PUBLICATIONS

Zhang et al., Automatic partitioning of full–motion video, Apr. 10, 1993, Multimedia System 1:10–28, pp. 10–28.*

* cited by examiner

Primary Examiner—Phuoc Tran
Assistant Examiner—Ishrat Sherali
(74) Attorney, Agent, or Firm—Stephen H. Shaw (57) ABSTRACT

A method for performing content-based temporal segmentation of video sequences, the method comprises the steps of transmitting the video sequence to a processor; identifying within the video sequence a plurality of type-specific individual temporal segments using a plurality of type-specific detectors; analyzing and refining the plurality of type-specific individual temporal segments identified in the identifying the plurality of type-specific individual temporal segments step; and outputting a list of locations within the video sequence of the identified type-specific individual temporal segments.

12 Claims, 10 Drawing Sheets

| START FRAME # | END FRAME # | SEGMENT TYPE |
|---|---|---|
| 0001 | 0025 | FADE |
| 0026 | 0193 | SHOT |
| 0194 | 0357 | SHOT |
| 0358 | 0622 | SHOT |
| 0623 | 0753 | DISSOLVE |
| 0754 | 0903 | SHOT |
| 0904 | 1157 | SHOT |
| 1158 | 1490 | SHOT |
| 1491 | 1776 | SHOT |
| 1777 | 1900 | FADE |
| 1900 | 2020 | UNIFORM |
| 2021 | 2563 | SHOT |
| 2564 | 2880 | SHOT |

FADE-IN AND FADE-OUT TEMPORAL SEGMENTS

CROSS REFERENCE TO RELATED APPLICATIONS

This is a divisional of application Ser. No. 08/902,545, filed Jul. 29, 1997 now U.S. Pat No. 6,195,458 by Warnick et al., entitled A METHOD FOR CONTENT-BASED TEMPORAL SEGMENTATION OF VIDEO.

FIELD OF THE INVENTION

The invention relates generally to the field of visual information management, and in particular to computer-implemented processing for content-based temporal segmentation of video sequences.

BACKGROUND OF THE INVENTION

Efficient representation of visual content of video streams has emerged as the primary functionality in distributed multimedia applications, including video-on-demand, interactive video, content-based search and manipulation, and automatic analysis of surveillance video. A video stream is a temporally evolving medium, where content changes occur due to camera shot changes, special effects, and object/camera motion within the video sequence. Temporal video segmentation constitutes the first step in content-based video analysis, and refers to breaking the input video sequence into multiple temporal units (segments) based upon certain uniformity criteria.

Automatic temporal segmentation of video sequences has previously centered around the detection of individual camera shots, where each shot contains the temporal sequence of frames generated during a single operation of the camera. Shot detection is performed by computing frame-to-frame similarity metrics to distinguish intershot variations, which are introduced by transitions from one camera shot to the next, from intrashot variations, which are introduced by object and or camera movement as well as by changes in illumination. Such methods are collectively known as video shot boundary detection (SBD). Various SBD methods for temporal video segmentation have been developed. These methods can be broadly divided into three classes, each employing different frame-to-frame similarity metrics: (1) pixel/block comparison methods, (2) intensity/color histogram comparison methods, and (3) methods which operate only on compressed, i.e., MPEG encoded video sequences (see K. R. Kao and J. J. Hwang, Techniques and Standards for Image, Video and Audio Coding, Chapters 10–12, Prentice-Hall, New Jersey, 1996).

The pixel-based comparison methods detect dissimilarities between two video frames by comparing the differences in intensity values of corresponding pixels in the two frames. The number of the pixels changed are counted and a camera shot boundary is declared if the percentage of the total number of pixels changed exceeds a certain threshold value (see H J. Zhang, A. Kankanhalli and S. W. Smoliar, "Automatic partitioning of full-motion video," ACM/Springer Multimedia Systems, Vol. 1(1), pp. 10–28, 1993). This type of method can produce numerous false shot boundaries due to slight camera movement, e.g., pan or zoom, and or object movement. Additionally, the proper threshold value is a function of video content and, consequently, requires trial-and-error adjustment to achieve optimum performance for any given video sequence.

The use of intensity/color histograms for frame content comparison is more robust to noise and object/camera motion, since the histogram takes into account only global intensity/color characteristics of each frame. With this method, a shot boundary is detected if the dissimilarity between the histograms of two adjacent frames is greater than a pre-specified threshold value (see H. J. Zhang, A. Kankanhalli and S. W. Smoliar, "Automatic partitioning of full-motion video", ACM/Springer Multimedia Systems, Vol. 1(1), pp. 10–28, 1993). As with the pixel-based comparison method, selecting a small threshold value will lead to false detections of shot boundaries due to the object and or camera motions within the video sequence. Additionally, if the adjacent shots have similar global color characteristics but different content, the histogram dissimilarity will be small and the shot boundary will go undetected.

Temporal segmentation methods have also been developed for use with MPEG encoded video sequences (see F. Arman, A. Hsu and M. Y. Chiu, "Image Processing on Compressed Data for Large Video Databases," Proceedings of the 1st ACM International Conference on Multimedia, pp. 267–272, 1993). Temporal segmentation methods which work on this form of video data analyze the Discrete Cosine Transform (DCT) coefficients of the compressed data to find highly dissimilar consecutive frames which correspond to camera breaks. Again, content dependent threshold values are required to properly identify the dissimilar frames in the sequence that are associated with camera shot boundaries. Additionally, numerous applications require input directly from a video source (tape and or camera), or from video sequences which are stored in different formats, such as QuickTime, SGImovie, and AVI. For these sequences, methods which work only on MPEG compressed video data are not suitable as they would require encoding the video data into an MPEG format prior to SBD. Additionally, the quality of MPEG encoded data can vary greatly, thus causing the temporal segmentation from such encoded video data to be a function of the encoding as well as the content.

The fundamental drawback of the hereinabove described methods is that they do not allow for fully automatic processing based upon the content of an arbitrary input video, i.e., they are not truly domain independent. While the assumption of domain independence is valid for computation of the frame similarity metrics, it clearly does not apply to the decision criteria, particularly the selection of the threshold values. Reported studies (see D. C. Coll and G. K. Choma, "Image Activity Characteristics in Broadcast Television," IEEE Transactions on Communication, pp. 1201–1206, October 1976) on the statistical behavior of video frame differences clearly show that a threshold value that is appropriate for one type of video content will not yield acceptable results for another type of video content.

Another drawback of the hereinabove methods is that they are fundamentally designed for the identification of individual camera shots. i.e., temporal content changes between adjacent frames. Complete content-based temporal segmentation of video sequences must also include identification of temporal segments associated with significant content changes within shots as well as a the temporal segments associated with video editing effects, i.e., fade, dissolve, and uniform intensity segments. Methods have be developed to specifically detect fade (U.S. Pat. No. 5,245,436) and dissolve (U.S. Pat. No. 5,283,645) segments in video sequences, but when any of the hereinabove methods are modified in an attempt to detect the total set of possible temporal segments, their performance is compromised. Such modifications commonly require more content dependent thresholds, each of which must be established for the specific video content before optimum performance can be achieved.

Therefore, there is a need for a method and system for performing accurate and automatic content-based temporal segmentation of video sequences.

SUMMARY OF THE INVENTION

The present invention is directed to overcoming the problems set forth above. One aspect of the invention is directed to a method for performing content-based temporal segmentation of video sequences comprising the steps of: (a) transmitting the video sequence to a processor; (b) identifying within the video sequence a plurality of type-specific individual temporal segments using a plurality of type-specific detectors; (c) analyzing and refining the plurality of type-specific individual temporal segments identified in step (b); and (d) outputting a list of locations within the video sequence of the identified type-specific individual temporal segments.

It is accordingly an object of this invention to overcome the above described shortcomings and drawbacks of the known art.

It is still another object to provide a computer-implemented method and system for performing accurate automatic content-based temporal segmentation of video sequences.

Further objects and advantages of this invention will become apparent from the detailed description of a preferred embodiment which follows.

These and other aspects, objects, features, and advantages of the present invention will become more fully understood and appreciated from a review of the following description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

As used herein, computer readable storage medium may comprise, for example, magnetic storage media such as magnetic disk (such as floppy disk) or magnetic tape; optical storage media such as optical disc, optical tape, or machine readable bar code; solid state electronic storage devices such as random access memory (RAM), or read only memory (ROM); or any other physical device or medium employed to store a computer program or data. A processor as used herein can include one or more central processing units (CPUs).

A video sequence as used herein is defined as a temporally ordered sequence of individual digital images which may be generated directly from a digital source, such as a digital electronic camera or graphic arts application on a computer, or may be produced by the digital conversion (digitization) of the visual portion of analog signals, such as those produced by television broadcast or recorded medium, or may be produced by the digital conversion (digitization) of motion picture film. A frame as used herein is defined as the smallest temporal unit of a video sequence to be represented as a single image. A shot as used herein is defined as the temporal sequence of frames generated during a single operation of a capture device, e.g., a camera. A fade as used herein is defined as a temporal transition segment within a video sequence wherein the pixels of the video frames are subjected to a chromatic scaling operation. A fade-in is the temporal segment in which the video frame pixel values change from a spatially uniform value (nominally zero) to their normal values within the shot. Conversely, a fade-out is the temporal segment in which the video frame pixel values change from their normal values to a spatially uniform value (nominally zero). A dissolve as used herein is defined as a temporal transition segment between two adjacent camera shots wherein the frame pixels in the first shot fade-out from their normal values to a zero pixel value concurrent with a fade-in of the frame pixels in the second shot from a zero pixel value to their normal frame pixel values.

As used herein, a temporal segment comprises a set of temporally consecutive frames within a video sequence that contain similar content, either a portion of a camera shot, a complete camera shot, a camera gradual transition segment (fade or dissolve), a blank content (uniform intensity) segment, or an appropriate combination of one or more of these. Temporal segmentation refers to detection of these individual temporal segments within a video sequence, or more correctly, detecting the temporal points within the video sequence where the video content transitions from one temporal segment to another. In order to detect the boundary between temporally adjacent segments, successive frame pairs in the input video sequence are processed by a computer algorithm to yield frame content comparison metrics that can be subsequently used to quantify the content similarity between subsequent frames.

Figure 1:
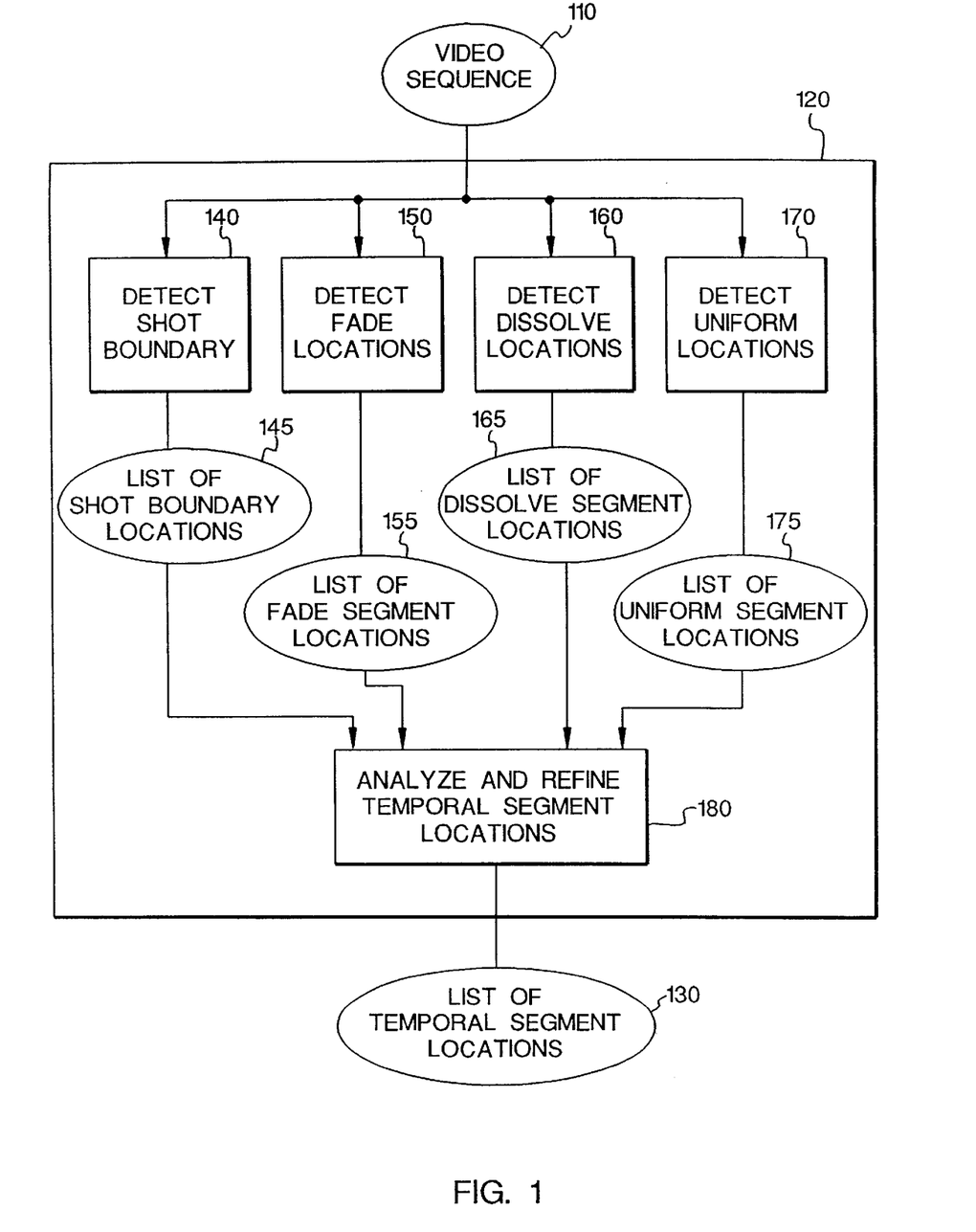
FIG. 1 is block schematic of a computer-implemented method for content-based temporal segmentation of video sequences.

Referring to FIG. 1, there is shown a schematic diagram of a content-based temporal segmentation method. The input video sequence 110 is processed 120 to determine the locations of the temporal segments 130 of the video sequence 110. Accurate detection of the different types of temporal segments within a video sequence requires that separate methods be employed, one for each type of temporal segment. Therefore, the process 120 of determining the locations of temporal segments 130 is achieved by the application of four type-specific temporal segment detection methods. Specifically, the method of content-based temporal segmentation 120 comprises detecting 140 camera shot boundaries (i.e., cuts), detecting 150 fade-in and fade-out segments, detecting 160 dissolve segments, and detecting 170 uniform color/gray level segments. The output from these individual detection processes is a list 145 of shot boundary locations, a list 155 of fade segment locations, a list 165 of dissolve segment locations, and a list 175 of uniform segment locations. These four lists of temporal segment locations are analyzed and refined 180 in order to resolve conflicts that may arise among the four detection processes and to consolidate the four lists into a single list 130 of temporal segment locations. Each of the type-specific temporal segment detection methods will be discussed in detail hereinbelow.

Shot Boundary Detection

Figure 2:
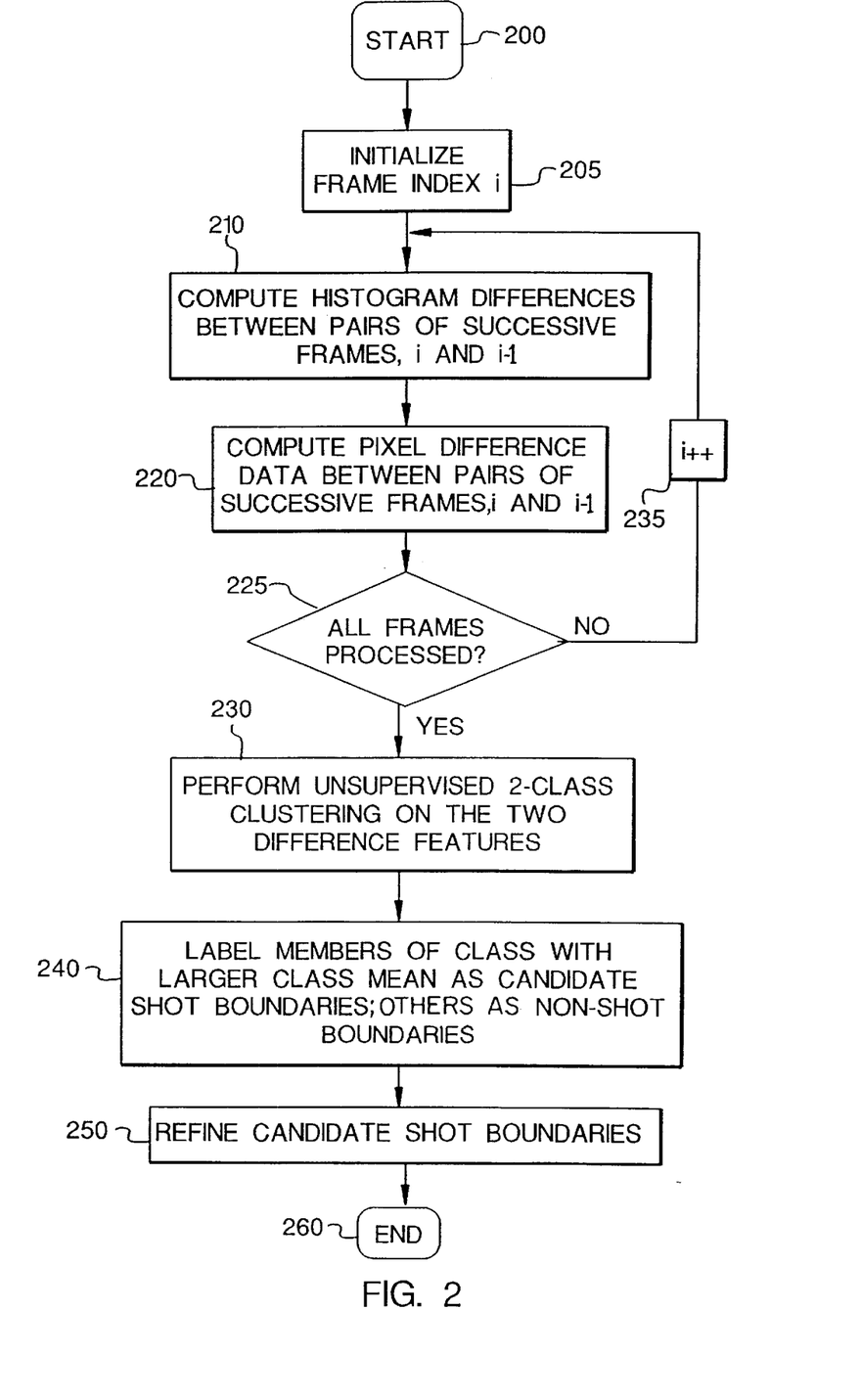
FIG. 2 is a detailed flow chart of the shot boundary detection component of the method.

Referring now to FIG. 2, the method of camera shot boundary (cut) detection 140 involves the computation of multiple frame comparison metrics in order to accurately detect the locations in the video sequence in which there is significant content change between consecutive frames, i.e., camera shot boundaries. In the preferred embodiment of the present invention, two different frame comparison metrics are computed. The first is a frame-to-frame color histogram difference metric 210 which is a measure of the color similarity of adjacent frames in the video sequence 110. This metric, as stated hereinbefore, is sensitive only to global color changes and relatively insensitive to object/camera motion. At camera shot boundaries, due to the sudden change in frame content characteristics, this metric will take on a value higher than that within a camera shot. However, different shots can have very similar color characteristics while having significantly different content, thus producing a small value in the color histogram frame difference metric at the shot boundary. Therefore, the color histogram frame difference metric 210 is supplemented with a pixel intensity frame difference metric 220, which is more sensitive to spatially localized content changes. This frame pixel difference metric 220 is a measure of the spatial similarity of adjacent frames in the video sequence 110 and will produce a large value at shot boundaries even when the color characteristics of the two shots are similar. However, this metric is more sensitive to local spatial content variations within a shot. Therefore, the output from these two metrics is combined to produce a more reliable indication of the true shot boundary locations.

The color histogram frame difference metric 210 is computed as the pairwise color histogram absolute difference between two successive frame histograms:

$$HD = \frac{\sum_j |H_{I-1}(j) - H_I(j)|}{NP}$$

where

HD is the color histogram absolute difference comparison metric, $H_{I-1}(j)$ is the jth element of the histogram from frame I-1, $H_I(j)$ is the jth element of the histogram from frame I, and NP is the number of pixels in the frame image.

Figure 3A:
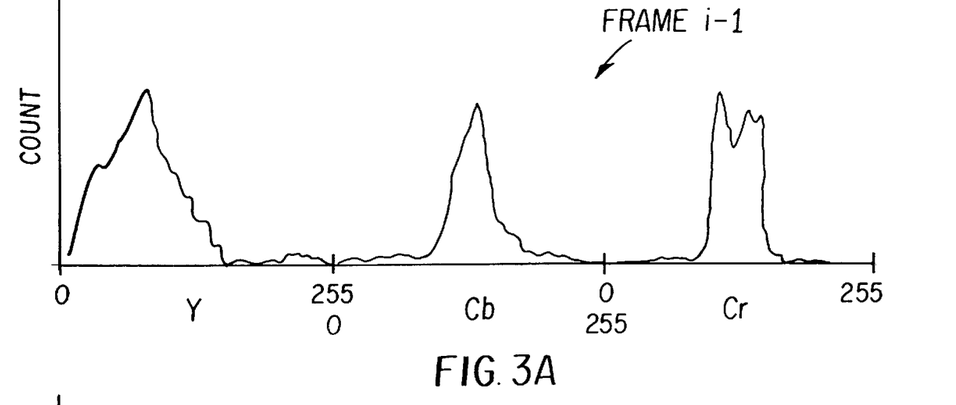
FIG. 3 illustrates the individual frame color component histograms and color histogram difference for two adjacent frames of a video sequence.
Figure 3B:
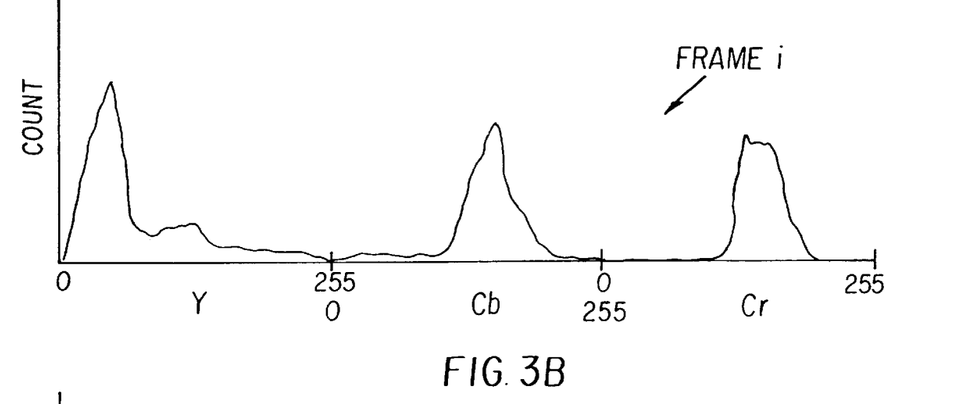
Figure 3C:
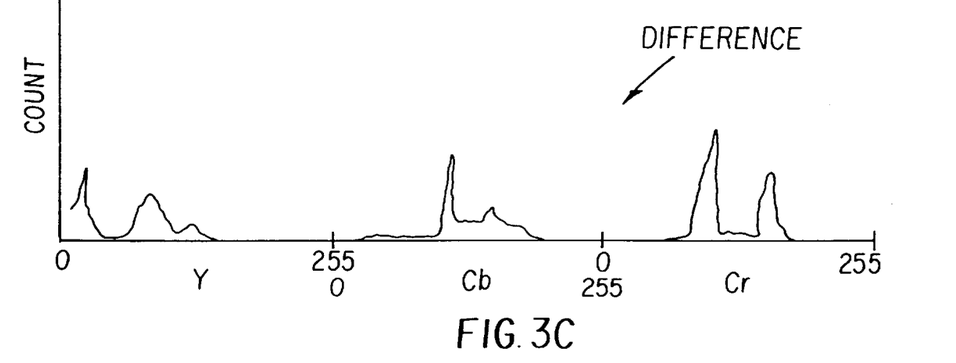

The color histogram $H_I(j)$ of each frame is computed from 24 bit YCbCr color pixel values. Color histograms for each component are computed individually and then concatenated to form a single histogram (see FIG. 3). Those skilled in the art will recognize that other color spaces, such as RGB, YIQ, L*a*b*, Lst, or HSV can be employed without departing from the scope of the invention. Additionally, multidimensional histograms or other methods for color histogram representation, as well as an intensity or luminance only histogram may be employed for histogram computation without departing from the scope of the invention. The selected color space can also be quantized to yield a fewer number of bins for each color component histogram.

The pixel intensity frame difference metric 220 is computed as $$PD(x, y) = 1 \quad \text{if } |F_{I-1}(x, y) - F_I(x, y)|\rangle NV$$
$$\phantom{PD(x, y) =} 0 \quad \text{else}$$

Then $$FPD = \frac{\sum_x \sum_y PD(x, y)}{NP}$$

where

PD(x, y) is the pairwise pixel difference at location (x,y)

$F_{I-1}(x, y)$ is the pixel value at location (x, y) in frame I-1, $F_I(x, y)$ is the pixel value at location (x, y) in frame I, NV is a noise value which PD(x, y) must exceed, FPD is the frame pixel difference metric, and NP is the number of pixels in the frame image.

The frame pixel value used in $F_I(x, y)$ and $F_{I-1}(x, y)$ is computed as a weighted sum of the pixel color component values at location (x, y) in frames I and I-1 respectively. The noise value NV, used to reduce the metric's sensitivity to noise and small inconsequential content changes, is determined empirically. In the preferred embodiment, a value of 16 for NV has been determined to be adequate to provide the desired noise insensitivity for a wide variety of video content. Those skilled in the art will recognize that the pixel intensity frame difference can be computed from pixel values in various color spaces, such as YCbCr, RGB, YIQ, L*a*b*, Lst, or HSV without departing from the scope of the invention. Additionally, the selected pixel value space can be quantized to yield a reduced dynamic range, i.e., fewer number of pixel values for each color component histogram.

The color histogram frame difference HD 210 and the pixel intensity frame difference FPD 220 are computed for every frame pair in the video sequence 110. Notice that no user adjustable threshold value is employed in the computation of either metric. Both sets of differences are passed into a k-means unsupervised clustering algorithm 230 in order to separate the difference data into two classes. This two class clustering step 230 is completely unsupervised, and does not require any user-defined or application-specific thresholds or parameters in order to achieve optimum class separation. The k-means clustering 230 is a well known technique for clustering data into statistically significant classes or groups (see R. O. Duda and P. E. Hart, Pattern Classification and Scene Analysis, pp. 201–202, Wiley, New York, 1973), the details of which will not be discussed herein. Those skilled in the art will appreciate that other cluster algorithms (see A. K. Jain and R. C. Dubes, Algorithms for Clustering Data, Prentice-Hall, N.J., 1988) can be employed to separate the data into two classes without departing from the scope of the invention. The k-means algorithm performs two class clustering on the frame comparison metrics iteratively, until the clustering process converges to two distinct classes 240, one representing the potential shot boundary locations and the other representing the non-shot boundary locations. The set of non-shot boundary locations is normally deleted.

Figure 4:
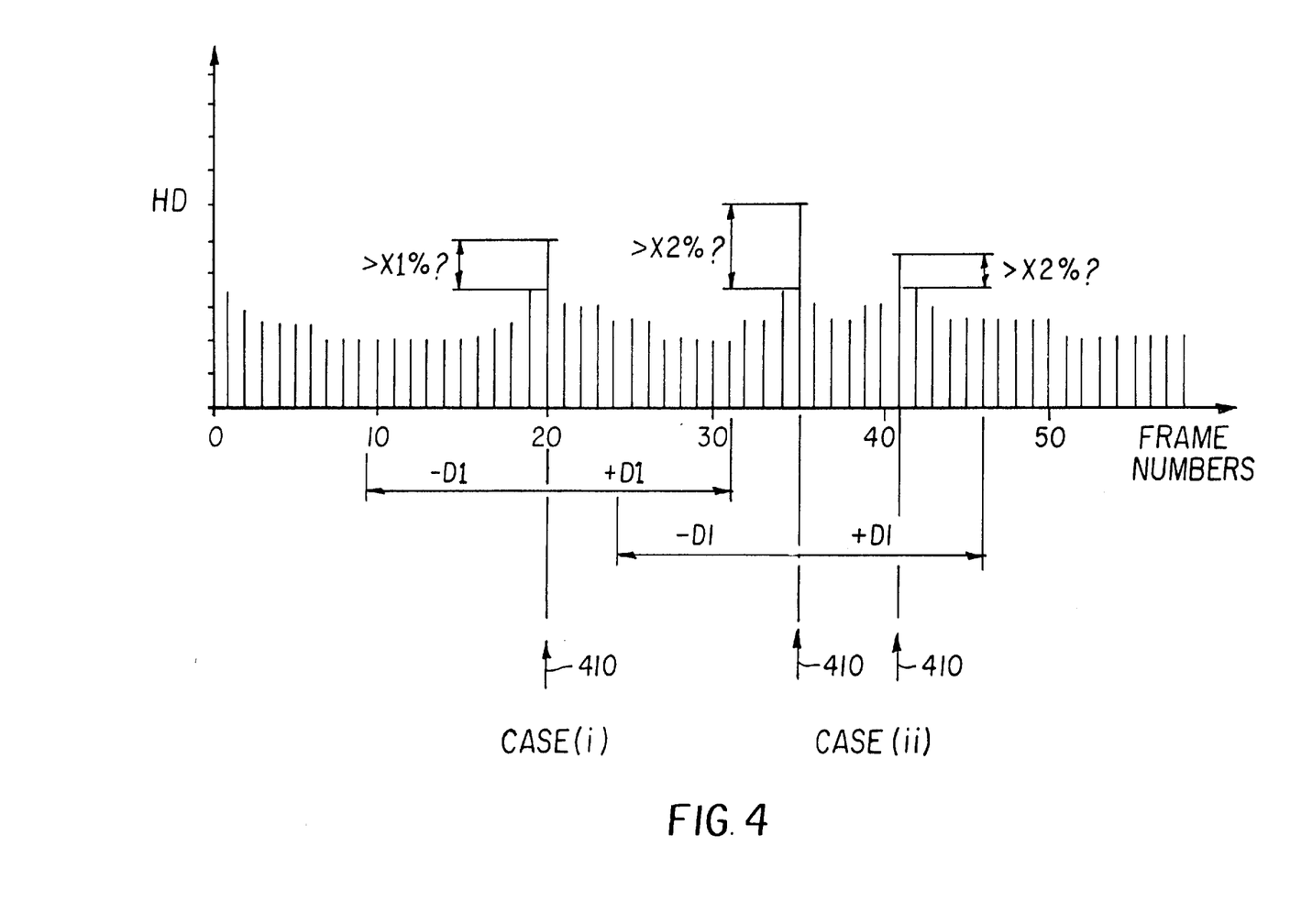
FIG. 4 is a temporal plot of the frame color histogram differences that illustrates the process of elimination of false positives.

The set of potential shot boundary locations contains both true shot boundary locations and a number of non-shot boundary locations (false positives) due to the overlap of the two classes in feature space after clustering. Therefore, the set of potential shot boundary locations is analyzed and refined 250 using the data from the set of color histogram frame differences. Referring now to FIG. 4, this refinement is accomplished by examining the color histogram frame differences for a local maxima at each location identified 410 as a potential shot boundary in the set of potential shot boundary locations. Two cases exist for refinement of the potential shot boundary locations:

Case (i)—If no other potential shot boundary exists within ±D1 frames of this location, then the frame histogram difference metric value must be greater than the metric value on either side by X1 % to be a shot boundary. If so, then leave the location in the set of potential shot boundary locations. If not, then discard this location from the set of potential shot boundary locations.

Case (ii)—If another potential shot boundary exists within ±D1 frames of this location, then the frame histogram difference metric value must be greater than the metric value on either side by X2 % to be a shot boundary, where X2 is greater than X1. If so, then leave the location in the set of potential shot boundary locations. If not, then discard this location from the set of potential shot boundary locations.

The optimum values for the parameters D1, X1, and X2 can be determined empirically. In the preferred embodiment, the values for D1, X1, and X2 are preset to 11, 06%, and 12% respectively. These values have been shown to yield excellent performance on video sequences containing a wide variety of content.

The result of this refinement 250 is the elimination of false positive locations from the list of potential shot boundaries, resulting in the final list 145 of shot boundary locations within the video sequence, each identified by numerical frame number. Those skilled in the art will appreciate that other frame comparison metrics can be used in either place of or in conjunction with the color histogram and pixel difference metrics described hereinabove without departing from the scope of the invention. Functions such as difference in frame differences, absolute frame differences, chi-square test for color histogram comparison, or any other function that yields sharp discontinuities in the computed metric values across shot boundaries while maintaining a low level of activity within individual shots can be employed. Furthermore, the comparison function may be computed over the entire frame, or only within a certain predefined spatial window within the frame, or over corresponding multiple spatial segments within successive frames. Multiple functions for frame comparison can be computed for every frame pair and all features may simultaneously be utilized as elements of a feature vector representing frame similarities. These feature vectors may then be employed in the clustering algorithm described hereinabove, and the shot boundary detection threshold may be obtained in the N-dimensional feature space. Alternatively, in place of computing the frame comparison metrics from the actual video sequence frames, such comparison metrics can be derived from difference images, motion vectors, DC images, edge images, frame statistics, or the like, which themselves are derived from the individual frames of the video sequence. Prior to clustering, the calculated frame comparison metrics can be preprocessed using median filtering, mean filtering, or the like, to eliminate false discontinuities/peaks that are observed due to content activity within a shot segment. Additionally, the input video sequence can be temporally sampled, and individual frames in the video sequence may be spatially sampled to reduce the amount of data processing in order to improve algorithm speed and performance.

Uniform Segment Detection

Figure 5:
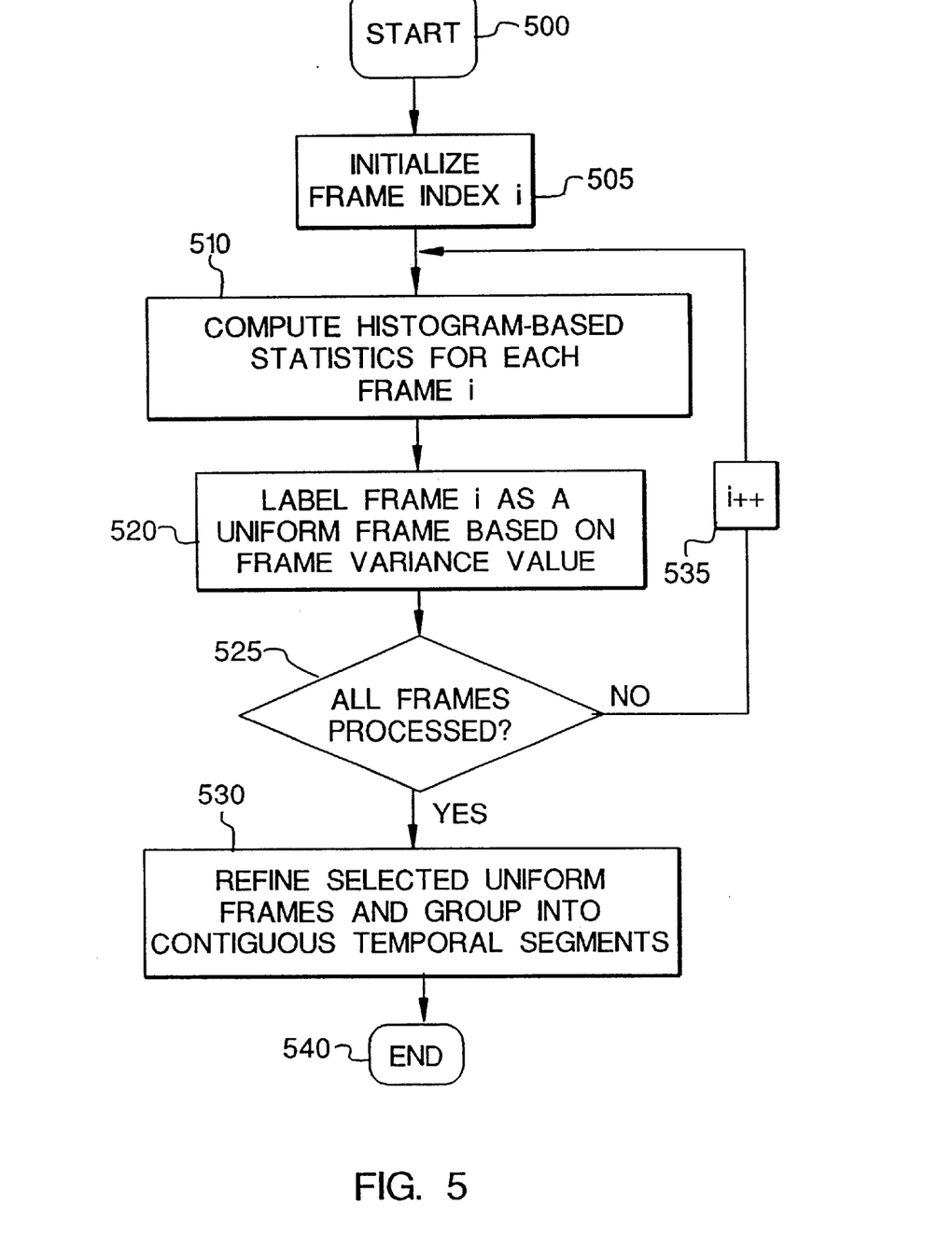
FIG. 5 is detailed flow chart of the uniform segment detection component of the method.

Returning now to FIG. 1, the video sequence 110 is also analyzed to detect 170 uniform temporal segments. Such segments frequently occur in video sequences in order to add a temporal spacing, or pause, in the presentation of content. The computed frame color histogram data used in the shot boundary detection as described hereinabove is also utilized for detecting temporal segments of uniform color/intensity. Referring to FIG. 5, the mean and variance of the individual color components in the color histogram are computed 510 for each frame in the video sequence 110:

$$HM_I = \frac{1}{NP}\sum_j jH_I(j)$$

where

HM$_I$ is the histogram mean value for frame I,

H$_I$(j) is the j$^{th}$ histogram value for frame I, and

NP is the number of pixels in frame I, and $$HV_I = \frac{1}{NP}\sum_j j(j-HM_I)^2$$

where HV$_I$ is the histogram variance value for frame I.

If a frame has a luminance component variance less than a predetermined amount V1, then that frame is selected 520 as a uniform frame and its temporal location is appended to the list 175 of uniform segment locations. All frames in the sequence are processed 525 to initially locate the potential uniform frames. This process is followed by a refinement process 530 to group the identified frames into contiguous temporal segments. In that process 530, if a uniform frame has been previously identified D2 frames prior, then all intermediate frames are selected as uniform and their temporal locations are appended to the list 175 of uniform segment locations. Finally, if the number of temporally adjacent frames in the uniform segment is less than M1 (the minimum number of frames that can constitute a uniform temporal segment), then delete the temporal locations of these frames from the list 175 of uniform segment locations. The optimum values for the parameters D2, V1, and M1 can be determined empirically. In the preferred embodiment, the values of D2, V1, and M1 are preset to 3, 0.1, and 15 respectively. These values have been shown to yield excellent performance on video sequences containing a wide variety of content. The final result of this uniform segment detection process 170 is a list 175 of uniform segment locations within the video sequence 110, each identified by a start frame and end frame number.

Fade Segment Detection

Referring to FIG. 1, the video sequence 110 is now analyzed 150 to detect fade-in/fade-out temporal segments. Fade segments in the video sequence 110 are temporally associated with uniform temporal segments, i.e., a fade segment will be immediately preceded or proceeded by a uniform segment. The beginning of each uniform temporal segment may correspond to the end of a fade-out segment. Likewise, the end of each uniform temporal segment may correspond to the beginning of a fade-in segment. Thus, it is sufficient to carry out fade temporal segment detection on the endpoints of every isolated uniform temporal segment.

Figure 6:
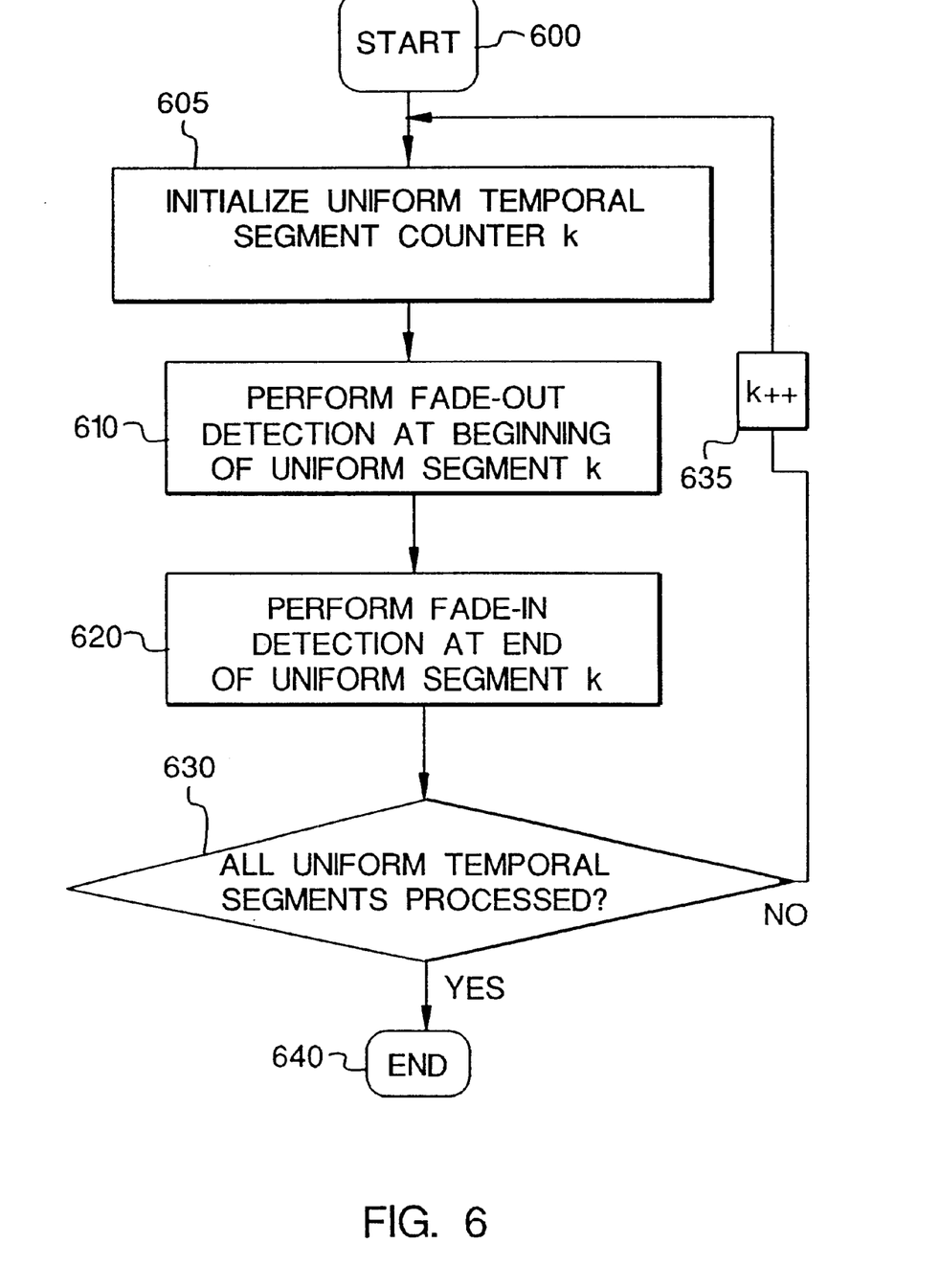
FIG. 6 is a detailed flow chart of the fade segment detection component of the method.
Figure 7:
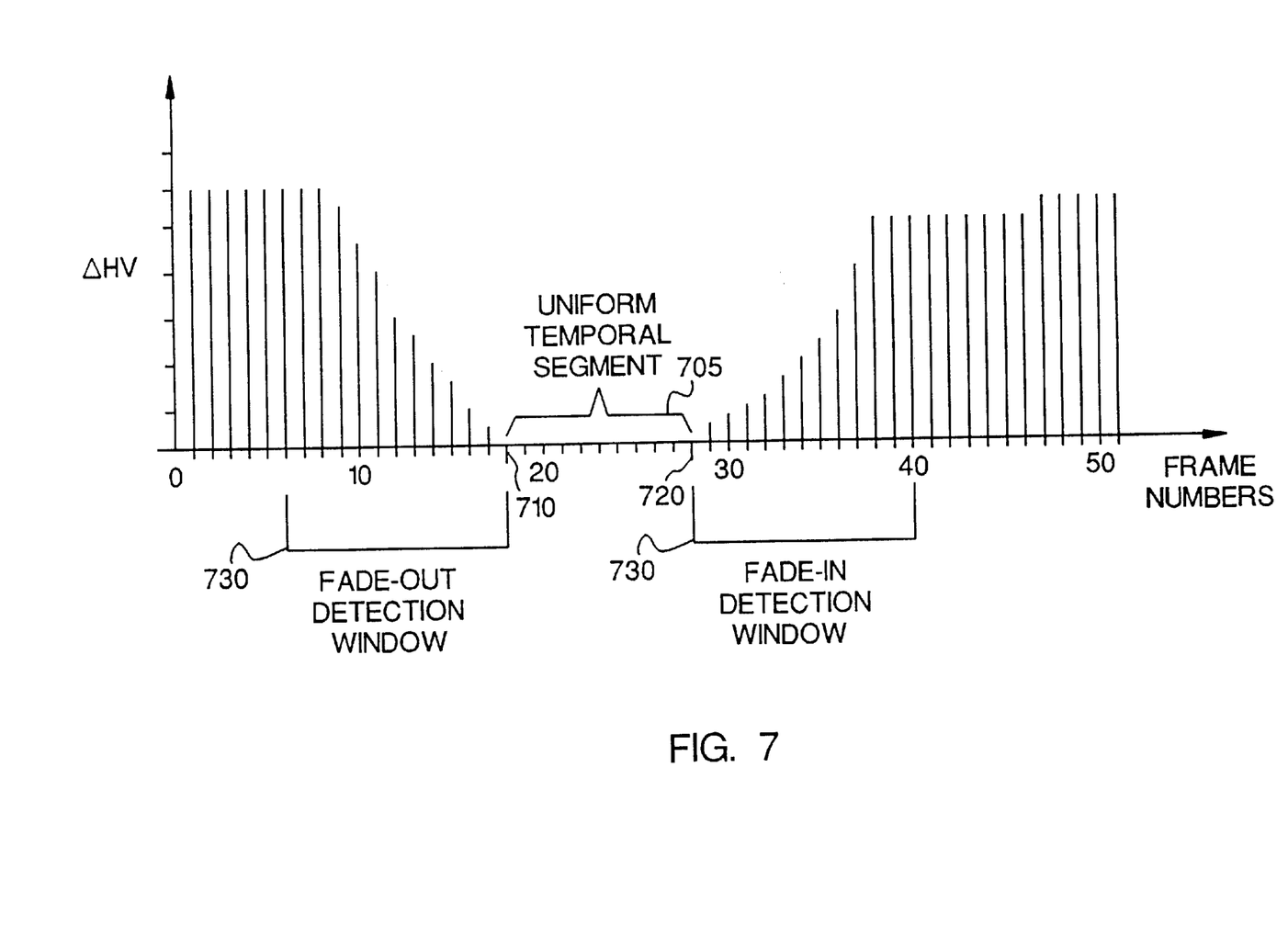
FIG. 7 is a temporal plot of the difference in frame color histogram variance that illustrates the process of detecting fade segments which are associated with uniform segments.

Referring to FIGS. 6 and 7, fade detection begins by locating 605 each of the uniform segments in the video sequence 110 previously identified by the uniform segment detection 170. The endpoints of each uniform segment 705, i.e., the beginning 710 and end 720 frames, are temporally searched over a immediately adjacent temporal window 720 of length W. For fade-out detection 610, frame index I is set to the first frame 710 of the uniform temporal segment 705. The difference in the color histogram variance between frames I-1 and I is computed as $$A_{FO} = HV_I - HV_{I-1}$$

If this difference A$_{OF}$ is greater than zero but less than an amount ΔHV, then frame I-1 is labeled as a fade-out frame. The frame index I is decremented, and the differences in color histogram variance are observed in a similar manner for all the frames that lie inside the window 730 of size W. If at any point in the analysis the color histogram variance difference A$_{FO}$ exceeds an amount ΔHV$_{max}$, then the fade-out detection process 610 is terminated and fade-in detection 620 is initiated within the window 730 at the opposite end of the uniform temporal segment 705.

The interframe variance difference A$_{FO}$ may sometimes fall below zero, due to noise in the subject frames or minute fluctuations in the luminance characteristics. In order to avoid mis-classifications due to such effects, the difference between I-2 and I is considered if the variance difference between frames I-1 and I falls below zero. If this second difference is found to be above zero, and if the variance difference B between frames I-2 and I-1 is found to satisfy the conditions 0<B<ΔHV, then frame I-1 is labeled as a fade-out frame and fade-out detection 610 proceeds as before.

For fade-in identification 620, frame index I is set to the last frame 720 of the uniform temporal segment 705. The difference in the color histogram variance between frames I+1 and I is computed as $$A_{FI} = HV_{I+1} - HV_I$$

If this difference A$_{FI}$ is greater than zero but less than an amount ΔHV, then frame I+1 is labeled as a fade-in frame. The frame index I is incremented, and the differences in color histogram variance are observed in a similar manner for all the frames that lie inside the window 730 of size W. If at any point in the analysis the color histogram variance difference A$_{FI}$ exceeds an amount ΔHV$_{max}$, then the fade-out detection process 620 is terminated, and the next previously identified uniform temporal segment in the video sequence is similarly analyzed. As with the detection 610 of fade-out temporal segments, the interframe variance difference A$_{FI}$ may sometimes fall below zero, due to noise in the subject frames or minute fluctuations in the luminance characteristics. In order to avoid mis-classifications due to such effects, the difference between I+2 and I is considered if the variance difference between frames I+1 and I falls below zero. If this second difference is found to be above zero, and if the variance difference B between frames I+2 and I+1 is found to satisfy the conditions 0<B<ΔHV, then frame I+1 is labeled as a fade-in frame and fade-in detection 610 proceeds as before. This process continues until all detected uniform temporal segments have been similarly analyzed.

When all frames within the window 730 have been processed for either fade-in or fade-out, fade detection is terminated, regardless of whether the variance differences continue to satisfy the conditions previously defined. Local averaging by mean filtering may be carried out on the variances of those frames that fall inside the window 730, in order to eliminate slight local variations in the variance characteristics that may yield false detection. In another embodiment, the window constraint may be removed, and fade detection may be carried out until the stated conditions are no longer satisfied. In the preferred embodiment, the values for ΔHV, ΔHV$_{max}$, and W are preset to $$\Delta HV = 0.1 \times Var(i)$$

$$\Delta HV_{max} = 32 \times Var(i)$$

$$W = 5$$

where Var(i) is the computed color histogram variance of frame I. These values have been shown to yield excellent performance on video sequences containing a wide variety of content. The final result of this fade detection process 150 is a list 155 of fade segment locations within the video sequence 110, each identified by a start frame and end frame number.

Dissolve Segment Detection

Referring again to FIG. 1, the video sequence 110 is analyzed to detect 165 dissolve temporal segments. Any of the known methods for detecting dissolve temporal segments can be employed. For example, Alattar (U.S. Pat. No. 5,283,645) discloses a method for the compression of dissolve segments in digital video sequences. In that method, the dissolve segments are detected prior to compression by analyzing the temporal function of interframe pixel variance. Plotting this function reveals a concave upward parabola in the presence of a dissolve temporal segment. Detection of a dissolve temporal segment is therefore accomplished by detecting its associated parabola which is present the temporal function of interframe pixel variance. Those skilled in the art will recognize that other known methods of characterizing a dissolve temporal segment may be employed without departing from the scope of the invention. The final result of this dissolve detection process 160 is a list 165 of fade segment locations within the video sequence 110, each identified by a start frame and end frame number.

Refine and Combine Locations

Figure 8:
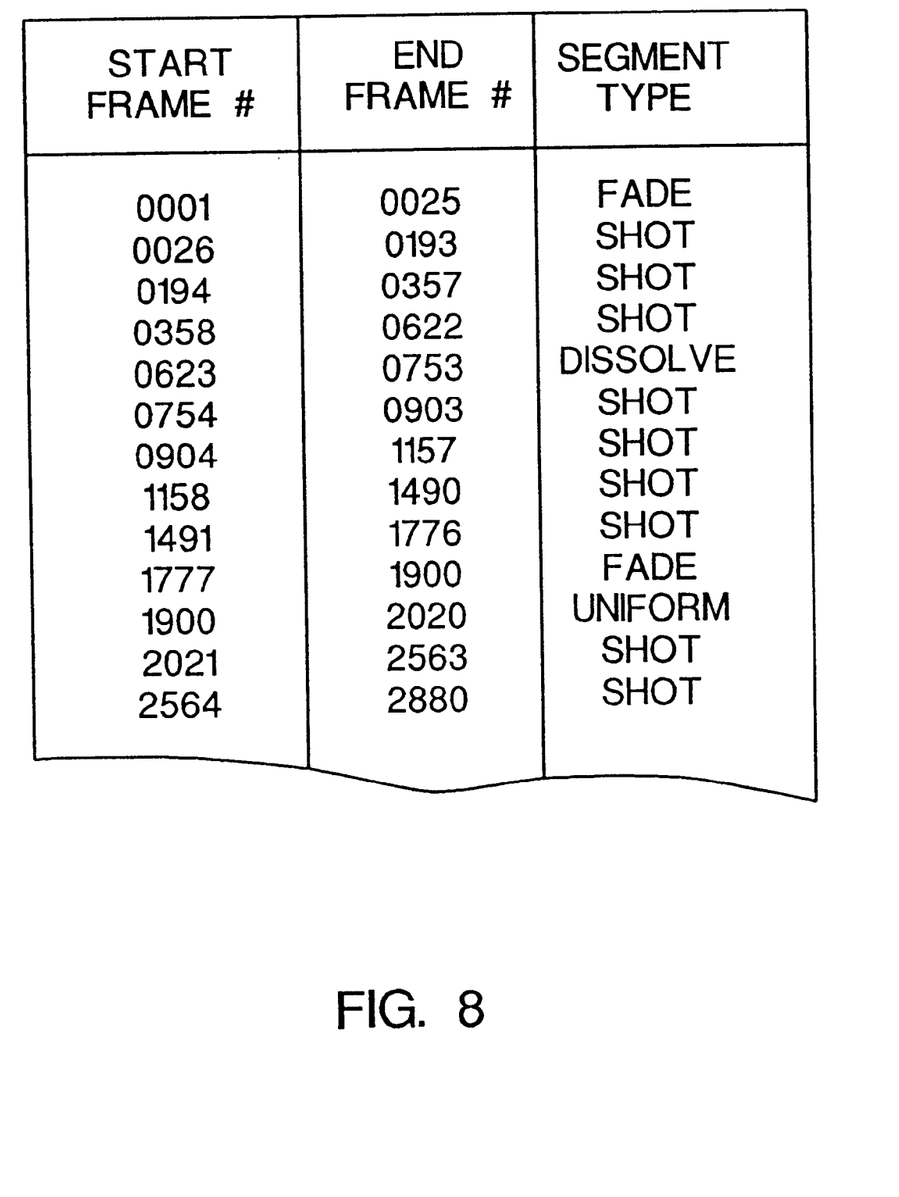
FIG. 8 is a diagram illustrated the format of the list of temporal segment locations.

After detection of the four types of temporal segments, the resulting four lists of temporal segment locations are refined and combined 180 to produce a single list 130 of the locations of the individual temporal segments contained in the video sequence 110. In the refinement process 180, each detected shot boundary location is checked against the detected fade segment locations, uniform segment locations, and dissolve segment locations. If any frame that has been detected as a shot boundary has also been flagged as part of a fade, dissolve, or uniform segment, that frame is removed from the list of shot boundary locations. Additionally, adjacent shot boundaries that are closer than a predefined number of frames, i.e., the minimum number of frames required to call a temporal segment a shot, are dropped. Spurious shot boundaries that are detected as a result of sudden increases in frame luminance characteristics are eliminated by a flash detection process. Flash detection involves discarding the shot boundary locations where a sudden increase in frame luminance is registered for the duration of a single frame. Such frames exist, for example, in outdoor scene where lightning is present. In the flash detection process, the frame statistics of the frame immediately prior to and following such a frame are observed to determine whether the frame color content remains constant. If this is the case, the sudden luminance change is labeled as a flash and does not signal the beginning of a new temporal segment. In the preferred embodiment, the mean of the frame luminance is used as the frame statistic for flash detection. After the refinement process is complete, the four lists of temporal segment locations are combined to produce a list 130 of temporal segment locations (see FIG. 8).

Figures 9, 9A:
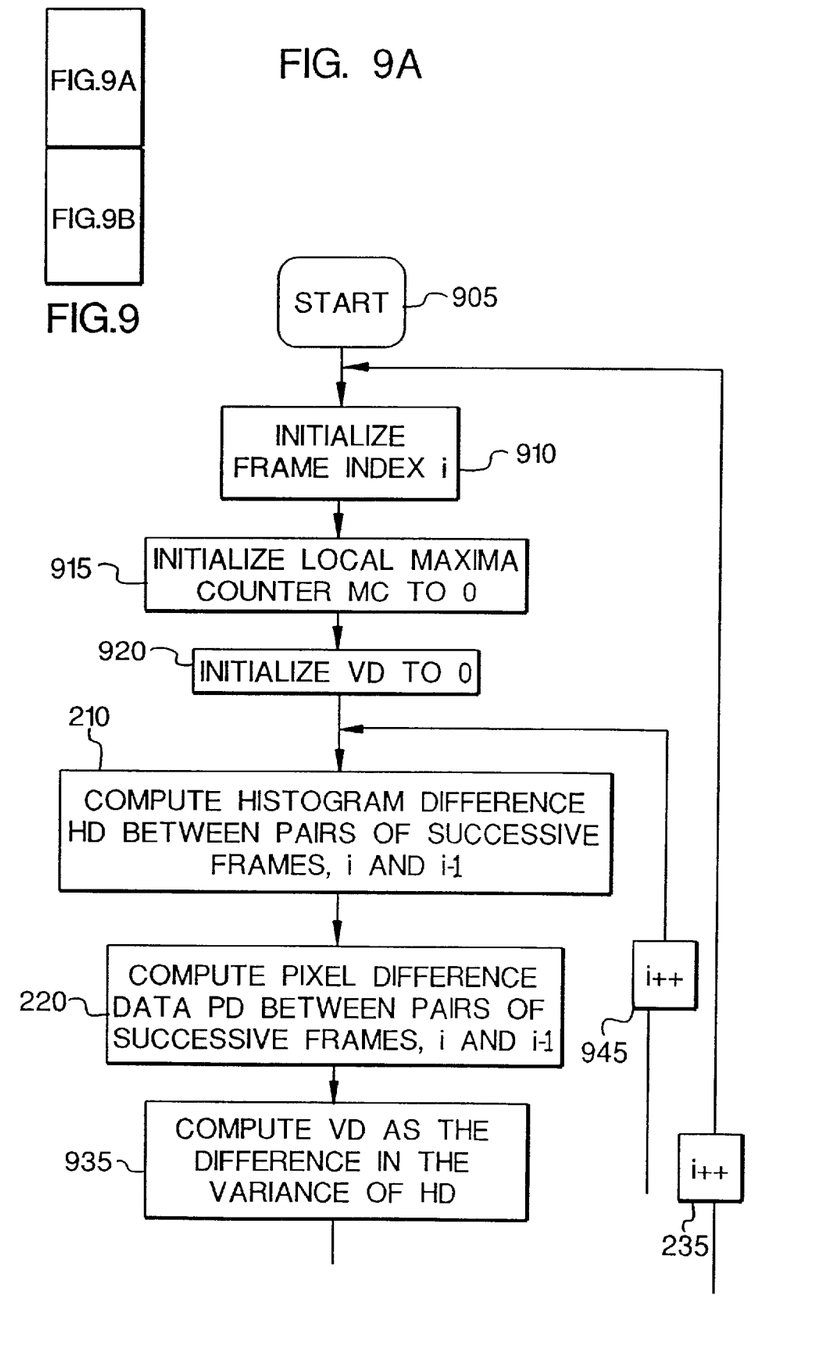
FIG. 9 is a flow chart of an alternative embodiment of the invention that performs temporal segmentation of a video sequence using temporal windows.
Figure 9B:
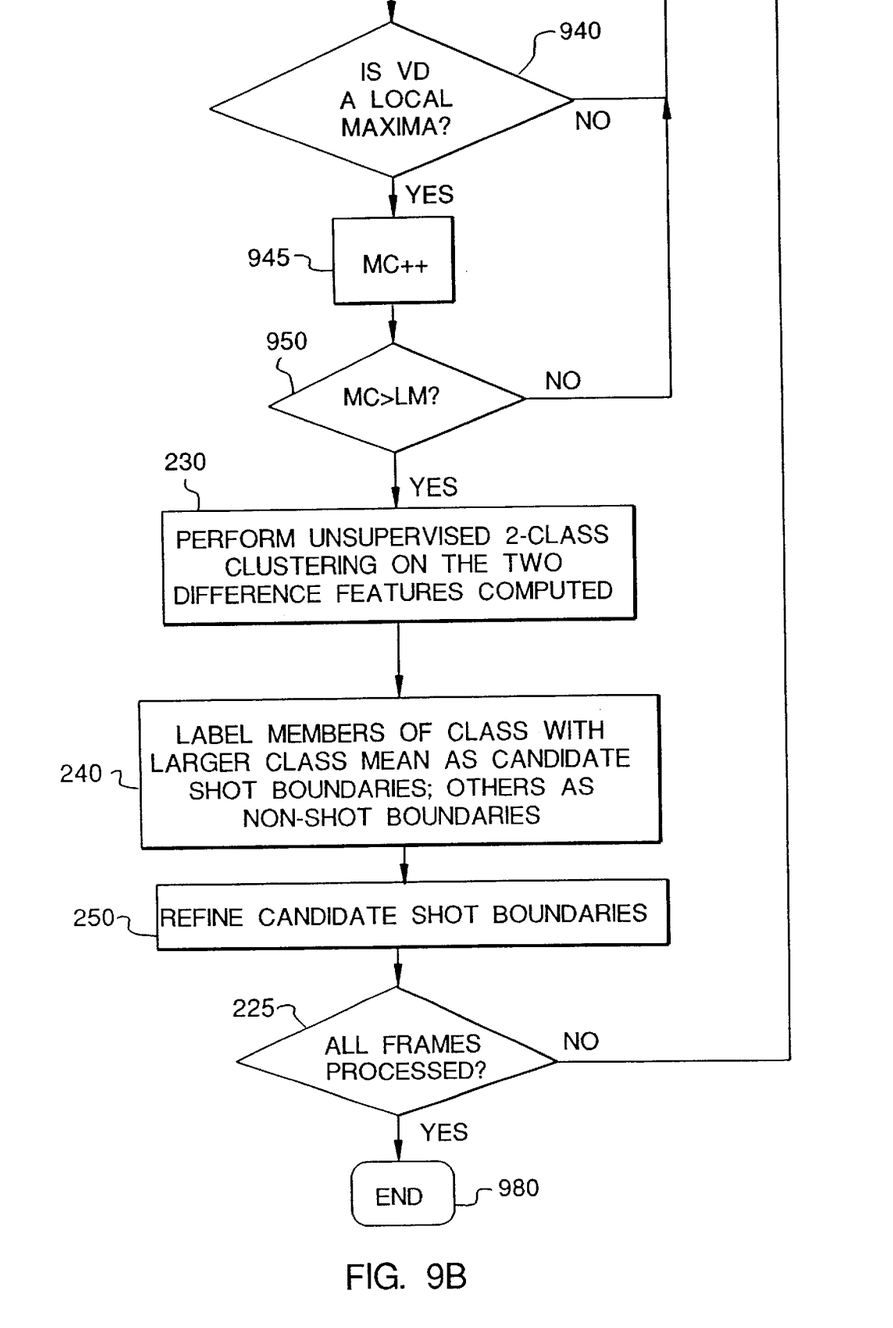

In the preferred embodiment described hereinabove, the frame color histogram difference and frame pixel difference metrics are computed for the entire video sequence 110 prior to clustering in order to produce the list of potential shot boundary locations. This is an acceptable approach for video sequences that can be processed off-line. For video sequences which required more immediate results or for video sequences of long duration, an alternative embodiment of the invention computes these frame difference metrics from frames within smaller temporal regions (windows) to provide a "semi-on-the-fly" implementation. The length of the temporal window can a predetermined amount, measured in frames or seconds. The only requirement is that within the temporal window there exist at least one true camera shot boundary for the clustering process to work properly. Alternatively, the temporal window length can be computed so as to insure that there exists at least one true shot boundary within the window. In this embodiment, the variance of the color histogram difference is computed at every frame as it is processed. The running mean and variance of this metric is computed sequentially as the frames of the video sequence are processed. At each significant shot boundary in the video sequence, the running variance value will show a local maximum value due to the significant change in the color histogram difference metric at this temporal location. When the number of local maxima is greater than LM, the temporal window length for the first window is set to encompass all frames up to that point and the data for the two difference metrics (color histogram difference and frame pixel difference) are passed into the clustering process as described hereinbefore. The running mean and variance value are reset and the process continues from that point to determine the length of the next temporal window. This process continues until the entire video sequence is processed. In this manner, the video sequence is parsed into smaller sequences so that the clustering and refinement results (shot boundary locations) are available for each smaller sequence prior to the completion of the processing for the full video sequence. The value of LM can be determined empirically. In the preferred embodiment, the value of LM is preset to 5. This value insures that the class of shot boundaries will be sufficiently populated for the hereinabove described clustering process and has been shown to yield excellent performance on video sequences containing a wide variety of content.

In summary, the hereinabove method and system performs accurate and automatic content-based temporal segmentation of video sequences without the use of content specific thresholds.

The invention has been described with reference to a preferred embodiment. However, it will be appreciated that variations and modifications can be effected by a person of ordinary skill in the art without departing from the scope of the invention.

What is claimed is:

1. A method for performing content-based temporal segmentation of video sequences comprising the steps of:

(a) transmitting the video sequence to a processor;

(b) detecting a plurality of shot boundary locations, wherein a frame color histogram difference and a frame pixel difference are computed for the video sequence, and a clustering operation is used to generate two distinct classes of shot boundary and non-shot boundary locations;

(c) detecting within the video sequence uniform intensity temporal segments;

(d) detecting within the video sequence fade in and fade out temporal segments by analyzing temporal frame properties, starting from an endpoint of the identified uniform intensity temporal segments;

(e) detecting within the video sequence dissolve temporal segments;

(f) refining and combining individual temporal segment locations to produce a single list of the individual temporal segment locations contained in the video sequence; including checking against detected uniform intensity segment locations, fade segment locations, and dissolve segment locations; and (g) outputting the single list of individual temporal segment locations within the video sequence including shot boundary locations, fade-in and fade-out segment locations, uniform intensity segment locations, and dissolve segment locations.

2. A method for performing content-based temporal segmentation of video sequences comprising the steps of:

(a) transmitting the video sequence to a processor;

(b) detecting a plurality of shot boundary locations, wherein a frame color histogram difference and a frame pixel difference are computed for the video sequence, and a clustering operation is used to generate two distinct classes of shot boundary and non-shot boundary locations;

(c) identifying within the video sequence a plurality of groups of uniform frames by analyzing color properties of temporal frames;

(d) detecting the content of a plurality of adjacent uniform frames, and refining the plurality of groups of uniform frames to detect a plurality of uniform intensity temporal segments;

(e) analyzing the color properties of temporal frames starting from an endpoint of the uniform intensity temporal segments to detect fade-in and fade-out temporal segments;

(f) detecting within the video sequence dissolve temporal segments;

(g) refining and combining individual temporal segment locations to produce a single list of the individual temporal segment locations contained in the video sequence; including:

(g1) removing from a list of shot boundary locations any frame that has been detected as a shot boundary and that also has been flagged as part of a uniform intensity segment, a fade segment, or a dissolve segment;

(g2) dropping adjacent shot boundaries that are closer than a predefined number of frames;

(g3) eliminating detected spurious shot boundaries resulting from sudden increases in frame luminance characteristics; and (h) outputting the single list of individual temporal segment locations within the video sequence including the detected shot boundary locations fade-in and fade-out temporal segment locations, uniform intensity segment locations, and dissolve segment locations.

3. The method of claim 2, wherein the step of identifying the plurality of groups of uniform frames includes analyzing temporal frame color component histogram variance.

4. The method of claim 2, wherein the step of analyzing the color properties of temporal frames for detection of fade-in and fade-out temporal segments includes analyzing a difference in color histogram variance between adjacent temporal frames.

5. The method of claim 1, wherein the step of identifying the uniform intensity temporal segments includes analyzing temporal frame color component histogram variance.

6. The method of claim 1, wherein the step of analyzing the temporal frame properties for detection of fade-in and fade-out temporal segments includes analyzing a difference in color histogram variance between adjacent temporal frames.

7. A computer storage medium having instructions stored therein for causing a computer to perform the method of claim 1.

8. A computer storage medium having instructions stored therein for causing a computer to perform the method of claim 2.

9. A computer storage medium having instructions stored therein for causing a computer to perform the method of claim 3.

10. A computer storage medium having instructions stored therein for causing a computer to perform the method of claim 4.

11. A computer storage medium having instructions stored therein for causing a computer to perform the method of claim 5.

12. A computer storage medium having instructions stored therein for causing a computer to perform the method of claim 6.

* * * * *